(12) United States Patent
Foley, Jr.

(10) Patent No.: US 9,805,615 B2
(45) Date of Patent: Oct. 31, 2017

(54) SYSTEMS AND METHODS FOR TESTING, EVALUATING AND PROVIDING FEEDBACK TO STUDENTS

(71) Applicant: Christopher P. Foley, Jr., McLean, VA (US)

(72) Inventor: Christopher P. Foley, Jr., McLean, VA (US)

( * ) Notice: Subject to any disclaimer, the term of this patent is extended or adjusted under 35 U.S.C. 154(b) by 126 days.

(21) Appl. No.: 14/544,276

(22) Filed: Dec. 18, 2014

(65) Prior Publication Data

US 2016/0180733 A1    Jun. 23, 2016

(51) Int. Cl.
*G09B 3/00*    (2006.01)
*G09B 7/00*    (2006.01)
*G09B 7/077*   (2006.01)

(52) U.S. Cl.
CPC ............. *G09B 7/077* (2013.01); *G09B 7/00* (2013.01)

(58) Field of Classification Search
USPC ........................... 434/322, 323, 350
See application file for complete search history.

*Primary Examiner* — Kesha Frisby

(57) ABSTRACT

Systems and methods are provided for preparing, taking and scoring a test, and reporting the results of the test. The methods include electronically storing questions for a test in a database, and inputting teacher preferences for taking the test. The method also comprises electronically transmitting contact data associated with the test to students, so the students can access the test. The method also comprises authenticating student identification when the test is accessed and applying the teacher preferences. The method further comprises electronically selecting test questions for the student based on the teacher preferences applicable to the student. Still further, the method involves electronically submitting answers to the test questions. In addition, the method comprises electronically scoring the answers to the test questions based on the teacher preferences, including electronically sending student test results to the teacher, including a summary of questions requiring manual review for each student.

8 Claims, 4 Drawing Sheets

SYSTEMS AND METHODS FOR TESTING, EVALUATING AND PROVIDING FEEDBACK TO STUDENTS

TECHNICAL FIELD

The present invention generally relates to computer-implemented systems and methods for improving the fairness, accuracy, scoring, and timeliness in the test taking process for the benefit of students and teachers. Moreover, the invention relates to systems and methods expanding the flexibility afforded to students and teachers in the test-taking process, while also ensuring an equitable and impartial process for all.

BACKGROUND

Academic institutions generally, and teachers in particular, have a daunting task in providing meaningful and comprehensive test-taking opportunities, which are fair to all students in a class, yet take into consideration the need for flexibility as a result of a wide range of reasonable exceptions. Such exceptions may include learning disabilities, absence due to illness, scheduling conflicts as a result of extracurricular activities, and other teacher obligations in and outside the classroom.

In addition, academic institutions with multiple instructors teaching the same courses benefit from standardization and simplification in the test-taking process to establish a consistent benchmark for the quality of education afforded each student regardless of the instructor. Similarly, instructors benefit from insights and input from other instructors in compiling probative questions and sharing varied techniques for expanding the knowledge of their students.

While solutions exist, classroom size alone can preclude the time for collaboration between students and instructors that typically required to address these concerns.

Another problem that exists is providing timely feedback to students. In some cases, students may learn the results of a test weeks after the test is taken, which may be too late to improve. Worse yet, the passage of time may have compounded a misunderstanding which might have been alleviated if feedback was available at an earlier stage.

In view of the foregoing, a need exists for improved systems and methods for providing test or homework questions that are capable of being graded automatically or with limited teacher input, and which analyze the answer so students learn from their mistakes as soon as the test is completed. There is also a need for improved systems and methods for providing oral responses, particularly in the case of language courses, where pronunciation and fluidity of expression are important. There is a further need to provide students with the flexibility of taking tests outside the regular classroom. Further still, there is a need to assist teachers in readily providing multiple different tests for common subject matter given at different times to students in the same class, for example, so that similarly situated students and their teachers have greater flexibility in the test-taking process without affecting the fairness of the test.

SUMMARY

Accordingly, embodiments consistent with the present invention relate to systems and methods that may alleviate one or more of the above-described limitations or disadvantages existing in the related art.

Consistent with disclosed embodiments of the present invention, a computer-implemented method is provided for creating a test for several students from a set of questions generated by a teacher, in an environment in which the students are permitted to use individual electronic devices, and each of the electronic devices are configured to provide each of the students with a representative test taken from the teacher's set of questions. The method includes sending the students the test electronically, wherein each of the tests may vary automatically depending upon teacher controls, such as variation in time when students activate the test site, or perhaps a teacher's preference for random generation of test questions to reduce, for example, the potential for cheating, among other things. The test may include various types of questions, including multiple choice, true/false, and fill-in-the-blank.

Consistent with disclosed embodiments of the present invention, a computer-implemented method is provided for also using speech to ask and/or respond to questions verbally. This feature is particularly advantageous for students with physical disabilities or speech disorders, as well as for language-based testing or courses in which fluidity of expression or pronunciation is being evaluated. The method includes adapting the electronic devices operated by the teacher and each of the students in a given class to send, receive and process audio data. Accordingly, the method includes generating one or more audio questions by the teacher transmitting the questions to the student, who after listening to the question, enters an audio response and transmitting the audio response to the teacher for evaluation.

Embodiments consistent with another aspect of the invention relate to a computer-implemented method for displaying an image, a series of images or a video recording followed by one or more questions. The method includes adapting the electronic devices operated by the teacher and each of the students in a given class to send, receive and process video data.

Embodiments consistent with another aspect of the invention relate to a computer-implemented system for immediately evaluating all or substantially all of each students answers in a test and automatically providing a response to the student once the evaluation is complete. The method may include providing the student with an explanation for any incorrect answer or for any answer that is partially correct.

Embodiments consistent with still another aspect of the invention relate to a computer-implemented system for compiling each students answers in a matrix and calculating a test score for each test based on several conditions set by the teacher. The method may include conditions, such as striking questions answered incorrectly by a predetermined number of students taking the test, and providing partial credit for certain answers. The method may also include generating a curve and providing a grade tied to the mean, average, or a predetermined range of test scores.

Embodiments consistent with still another aspect of the invention related to a computer-implemented method for compiling test scores throughout the length of a course, averaging the scores based on the weight accorded each test, quiz or homework assignment, and periodically providing an interim grade for each student associated with the test scores.

Embodiments consistent with still another aspect of the invention relate to a computer-implemented for standardizing testing by providing multiple teachers teaching the same course to a different set of students with access to the database. The method includes electronically compiling questions generated by one or more teachers into discrete subject categories; electronically selecting a predetermined number of questions from one or more subject categories being tested; automatically generating emails to each student taking a test with contact data associated with the test, and electronically transmitting contact data associated with the test to students; automatically selecting test questions for the student associated with the contact data based on preselected parameters set by the teacher(s); electronically submitting answers to the test questions; electronically scoring answers submitted by the student; and electronically sending analysis of the answer to the student. The method also includes electronically scoring each test based on scoring parameters set by the teachers; electronically compiling the score for each student; and electronically reporting the score to the student.

BRIEF DESCRIPTION OF THE DRAWINGS

The accompanying drawings, which are incorporated in and constitute a part of this specification, illustrate embodiments consistent with the invention and together with the description, serve to explain the principle of the invention. In the drawings.

DETAILED DESCRIPTION OF THE EMBODIMENTS

Figure 1:
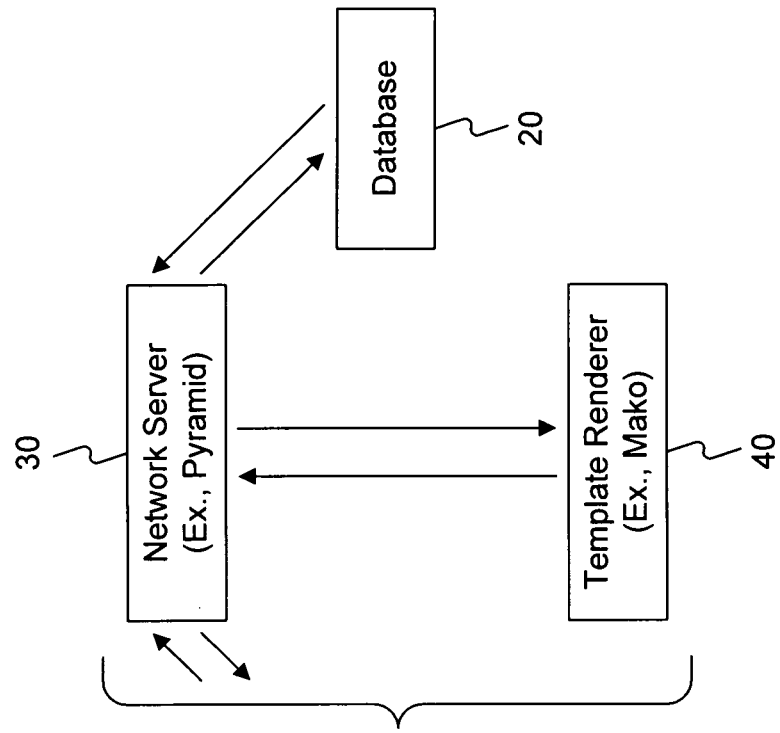
FIG. 1 illustrates an exemplary system environment for implementing embodiments of the present invention.
Figure 1:
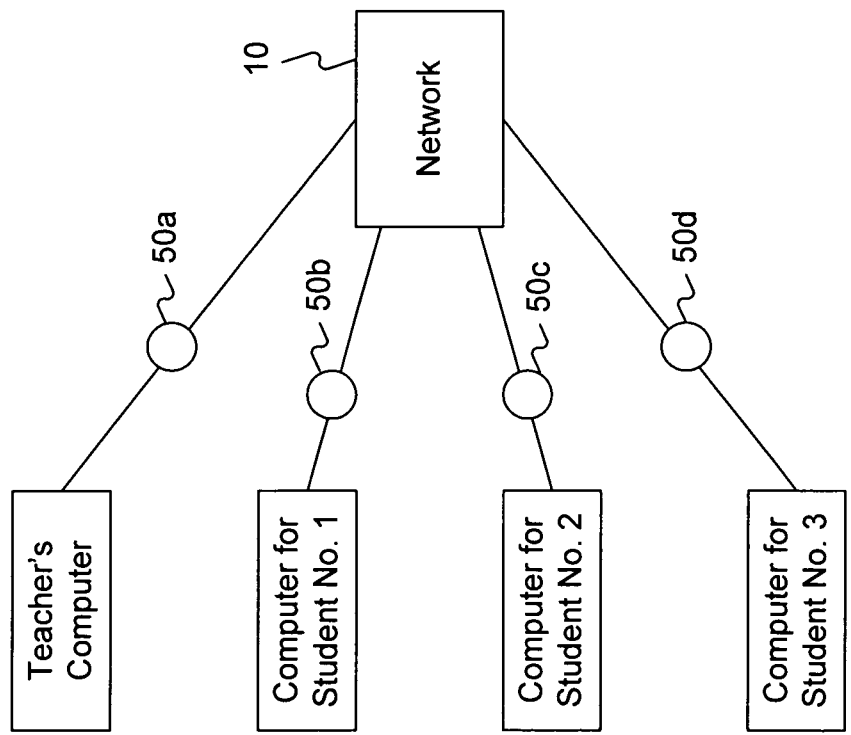

Reference will now be made in detail to exemplary embodiments consistent with the invention, examples of which are illustrated in the accompanying drawings. The same reference numerals will be used throughout the description and the drawings to refer to the same steps and like parts.

The following detailed description refers to the accompanying drawings. While several exemplary embodiments and features of the invention are described, modifications are possible without departing from the scope of the invention. For example, it is possible to reorder or substitute steps featured in the drawings. Accordingly, the description is merely exemplary and does not limit the invention.

Embodiments consistent with the invention are directed to systems, methods, and computer-readable media for compiling, conducting, and scoring a test or homework assignment, and, more preferably, a number of tests or homework assignments for students taking a course having several subject areas or chapters taught in sequence over a period of time. Embodiments consistent with the invention may be implemented in various computer-based environments in and outside the classroom, using personal computers, personal digital assistants (PDAs), mobile phones, tablets, microprocessor-based programmable devices, and other computing devices, work stations, networked and other computer-based environments connecting each student with one or more teachers. The present invention, however, is not limited to these examples. Indeed, embodiments consistent with the invention may be implemented using other computer-based systems more commonly available in a classroom, such as desktops or mainframe computers.

The computer-based systems used to implement features of the present invention temporarily or permanently store data and instructions. Various types of storage media may be used to implement features of the present invention, including random access memory (RAM) and read-only memory (ROM), a hard disk, an optical disk, magnetic media, a flash memory, other permanent, fixed or volatile memory devices, or any other mechanism capable of storing instructions. Accordingly, the memory functions of the present invention may be implemented by various computer-readable media, such as magnetic media, optical media, and semiconductor media.

Embodiments consistent with the present invention may include computer program products stored in a computer-readable medium or transmitted by an electronic signal between computers or other devices. Networking devices are common in schools and may include school-wide networks, intranets, or the Internet. The network, as generally illustrated by reference numeral 10, may be wired or wireless.

Transmission protocols consistent with the present invention may include hypertext transfer protocol (HTTP), secure HTTP, unique resource locator (URL), unique resource identifier (URI), hypertext markup language (HTML), and wireless application protocols. Other data formats and languages may also be used to implement features of the present invention, such as CSS, JavaScript, JavaScript Object Notation (JSON), Python, Pyramid, Mako, and Recorder.js. One or more of these data formats, like JSON, are language independent and are familiar to programmers of the C-family of languages, for example, including C, C++, JavaScript, Perl, and Python, among others. JSON provides a programmer with a vehicle for taking an arbitrary data type and turning the data into a string, which is like a sentence.

Figure 2:
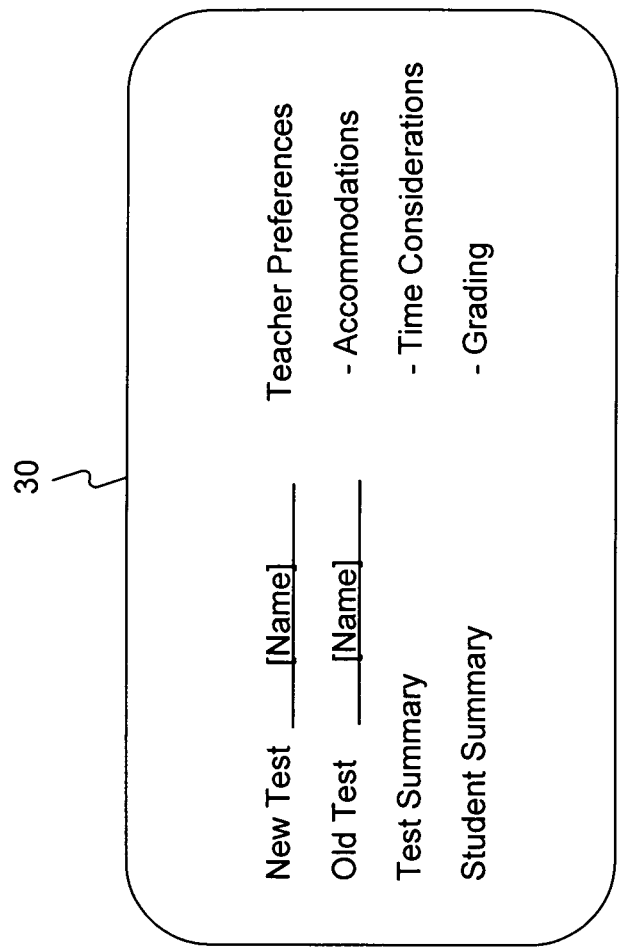
FIG. 2 illustrates a teacher dashboard configuration illustrating functional features for implementing embodiments of the present invention.

The network 10, as shown in FIG. 1, provides teachers and students with access to a database 20 which inputs, stores, retrieves and manages test questions, answers and results. As shown in FIGS. 1 and 2, a teacher and students 1, 2 and 3 are connected to the network 10 through individual computing devices which are able to communicate with the database 20. The database 20 is also set up to send and receive information through one or more different types of servers or files, such as a Pyramid server 30 and a Mako template renderer 40. The template renderer 40 is a file which can be used to perform tasks within the Pyramid server 30, such as sending, receiving and analyzing textual and audio questions and responses to test questions.

The database 20 is a TXT document library containing all of the variables and all the tests or homework assignments, student information and scoring information and summaries the teacher wants to save. The server 30 saves information, such as test questions, in the database 20 depending on the type and classification of the information. The server 30 functions as a librarian by placing teacher and student generated information in the database in a unique location for each specific type of data.

In FIG. 1, teachers and students interface with the network 10 through a client server 50a-d. In this system, tasks are distributed between providers of service, like the Pyramid server 30, and service requesters, the client servers 50a-d. The servers are classified by the services they provide and may be part of a shared computer resource at a school. When a teacher generates questions, as will be described in greater detail hereinafter, the teacher is sending text by HTML to a Pyramid server and the transmission protocol is indicating the variables or information for the teacher instructed to be saved. The Pyramid server 30 takes the variables and stores the information in a TXT document in the database 30. The teacher initiates a test or assignment by sending students a URL unique to each student in the class. When a student wishes to take a test, the student enters login information and, in doing so, is asking the server to verify the student's entity and to provide the information. The server 30 will analyze information in the database 20, verify the login information and retrieve the test for that student.

FIG. 1 shows a template renderer 40. A template is a file which can be used to render dynamic data. A server 30, such as a Pyramid server, offers a number of ways to perform templating tasks. The Mako template renderer 40 comes into play because it is in a closed loop of communication with the Pyramid server. If the teacher is generating a question for a test, the language for communicating may be Python. A question using Python will generate an HTML code. To do so, the Pyramid server 30 uses the Mako template renderer 40. The template renderer 40 is always in a closed loop with the Pyramid server 30. The Pyramid server 30 always asks something of the template renderer 40, and the template renderer 40 always responds to the Pyramid server 30. Therefore, when the teacher wants a student's test, the client server 50*a* will communicate with the Pyramid server 50*a*, the Pyramid server 50*a* will communicate with the database 20, the Pyramid server 50*a* will communicate with the template renderer 40, then the Pyramid server will provide the information to the client server 50*a*, and the teacher will be able to display the student's test. Accordingly, the network server 30 is always the middleman tasked with fulfilling the request and delivering the response.

Audio information can also be transmitted by the student and the teacher. Text and audio information are objects and can have different properties. Jason is a protocol or technique for turning objects into strings of text. Jason breaks down an object into a universal notation for how to characterize the object. Using Jason, an audio segment is converted into a string of text and it can be stored the same as text. The only difference is that the audio string has to be reconverted into an object to listen to the response.

Images can also be used in the tests of the present invention. The client side server, 50*a* for example, breaks down into a text string that can be sent between client servers 50*a*-*b*, network server 30 and database 30.

In the computer-based system of the present invention, a teacher logs into the test website by clicking a link for the teacher dashboard 60 on the teacher's graphic user interface (GUI) 70. The teacher dashboard 60, as shown generally in FIG. 3, includes a prompt for adding a test and giving the new test a name, or going to another test which can be shown on the teacher GUI 70 by identifying the test by name. A summary of all tests, quizzes and assignments can be pulled up by clicking a link on the teacher dashboard 60 which may be marked test summary. The teacher dashboard 60 may also include a student summary link, which may identify each student broken down by class. The student summary link may include information related each student's grades on prior tests, quizzes and assignments; a cumulative grade; information related to accommodations, such as extra-time; and the student's email address.

In the computer-based system of the present invention, the teacher dashboard 60 also includes a link for teacher preferences. The teacher preference link enables the teacher to add a filter to automatically identify students with accommodations and automatically apply the specific accommodations being provided. For example, accommodations may include additional time (half-time, double-time, etc.) a reduction in the number of questions asked, or elimination of a certain type of questions.

The teacher preference link on the teacher dashboard 60 may also be used to include a filter which electronically registers the time the student logs on to take a test. If the time exceeds a predetermined limit after students are sent a URL (i.e., contact information) from the teacher authorizing students to take the test, the filter can trigger events preset by the teacher. For example, if the time difference exceeds an hour, the questions may be automatically reordered or replaced with other questions. If the time difference exceeds 48 hours, the teacher may require the student to request that the URL be refreshed or reauthorized. The teacher preference link may be programmed so that the students responses are automatically submitted a predetermined amount of time after the student accesses the URL on logs into begin the test.

The teacher preference link on the teacher dashboard may be used to include a filter which automatically records questions answered in error by a predetermined number of students and excludes those questions in the final tabulation of each student's score. For example, the teacher may input a preference that automatically excludes from consideration any question that 90% of the class answers in error.

The teacher preference link on the teacher dashboard 60 may also be used to automatically incorporate teacher preferences with respect to grading. The teacher preference may be preset, but it may be advantageous for the teacher to adjust grading preferences after the completion of the test by the class. The preferences may include a curve tied to the mean or average score; adjustment of the numeric score and the corresponding letter grade equivalent; and assessment of the weight accorded each of the questions.

Figure 3:
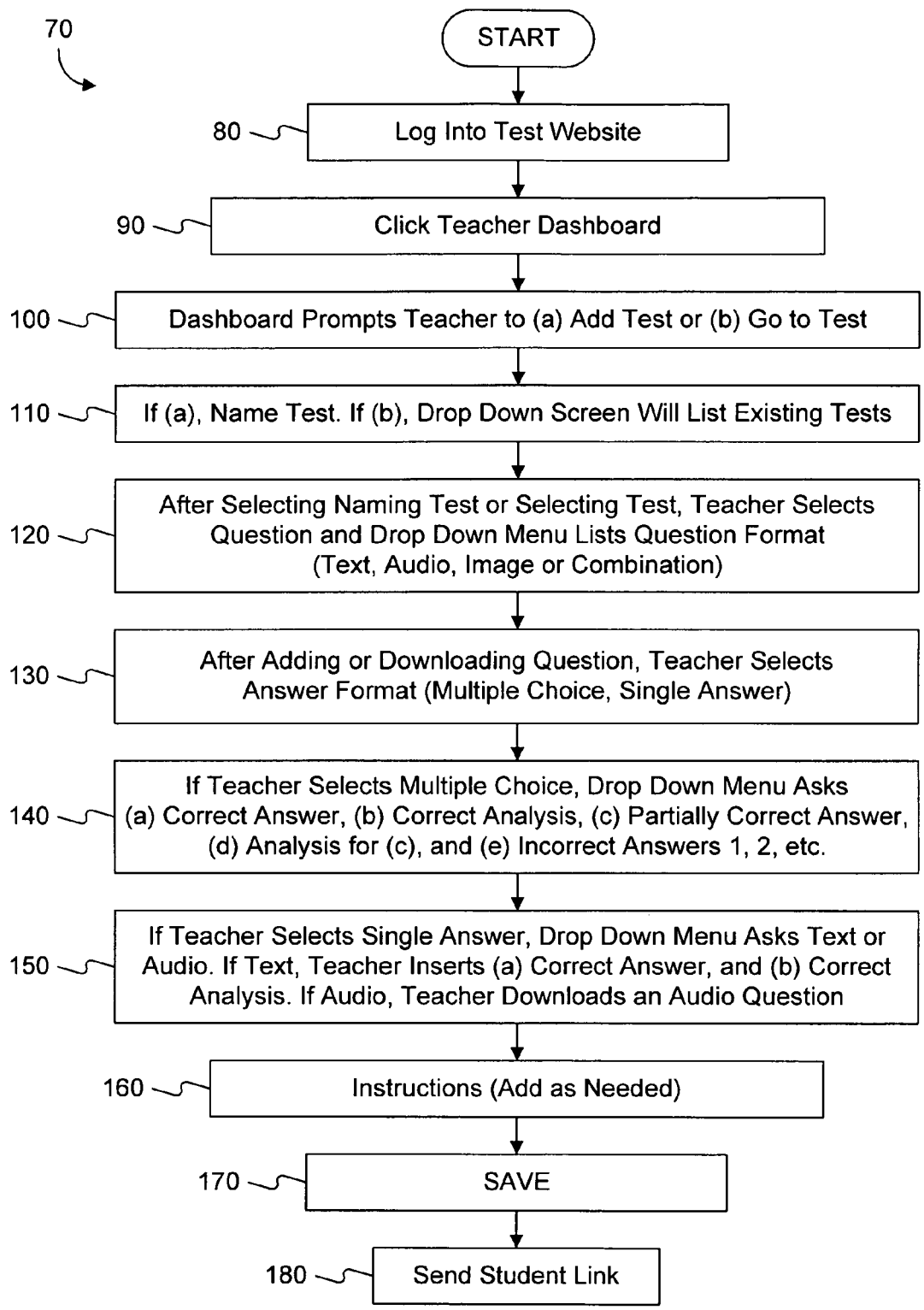
FIG. 3 is a flowchart of an exemplary process for developing a test, quiz or assignment consistent with embodiments of the present invention.

Consistent with embodiments of the present invention, and as shown generally in FIG. 3, the method includes the following steps related to the teacher graphic user interface 70, namely: logging into the website (Step 80); clicking teacher dashboard icon 60 (Step 90); and prompting from the dashboard 60 for the teacher to either add a new test or go to an existing test (Step 100). If a new test is added, teacher will be prompted to the name the test; whereas, if the teacher wants to review an existing test, the drop down screen will list existing tests (Step 110).

After naming the test or selecting an existing test, the teacher selects question and the menu lists several question formats, such as text, audio, image or combination thereof (Step 120). After adding or downloading the question, the teacher selects the answer format, such as multiple choice or single answer (Step 130). If the teacher selects multiple choice, the drop down menu asks the teacher to provide (a) the correct answer, (b) correct analysis, (c) any partially correct answer, (d) analysis for (c), and (e) one or more incorrect answers (Step 140). If the teacher selects a single answer, the drop down menu asks text or audio. If text, the teacher inserts (a) the correct answer, and (b) the correct analysis. If audio, the teacher downloads an audio question (Step 150). The teacher may add questions in this manner ad seriatum.

The teacher may wish to add instructions which will appear at the beginning of the test (Step 160). If the teacher plans to work on the test later or considers the test complete, the test will be saved (Step 170). Once ready to give the test to the class, the teacher will be able to automatically send each student a link simultaneously (Step 180), which typically is a URL including the student's name and the name of the test since the email address for each student in the class is stored in the database.

Figure 4:
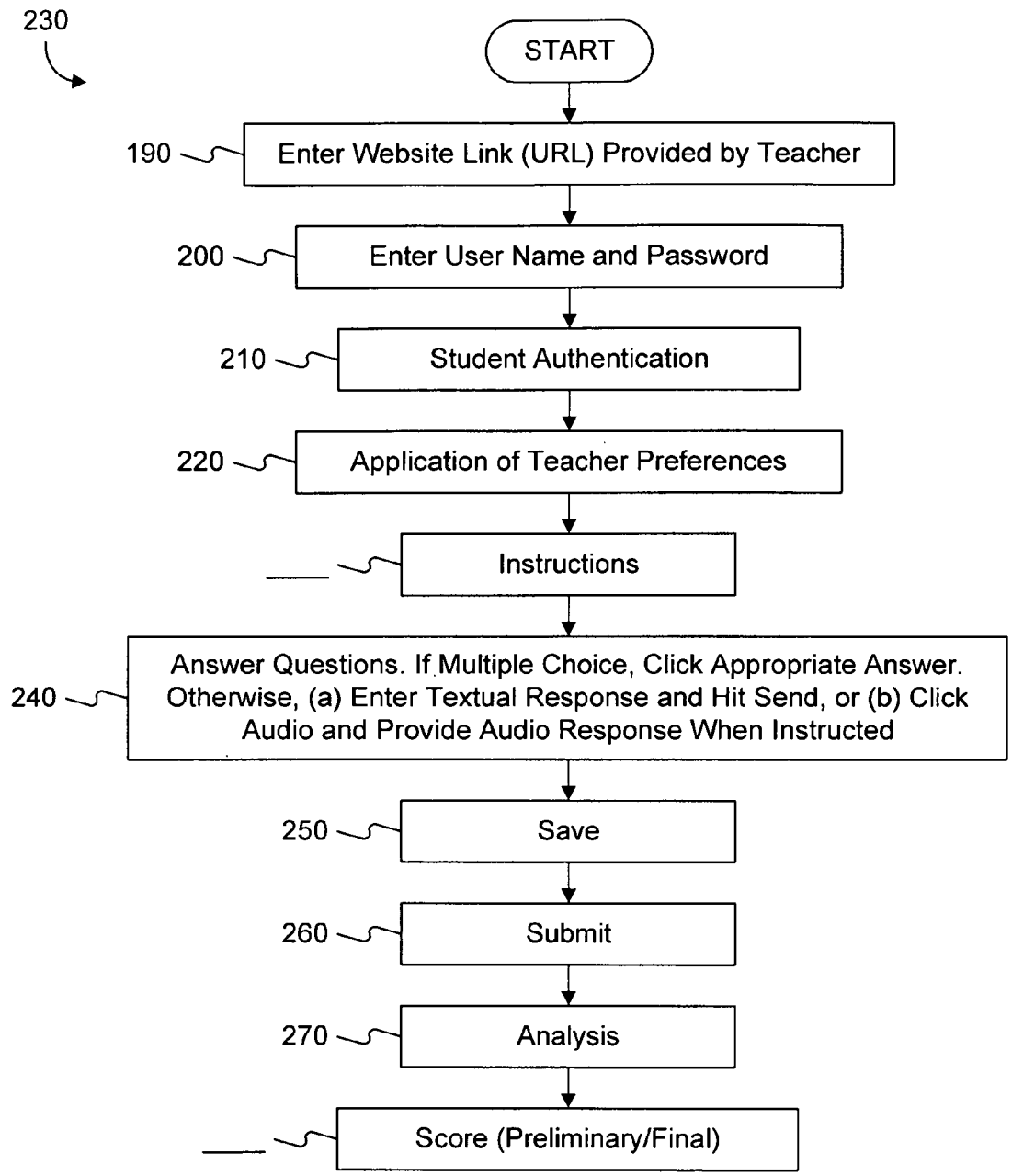
FIG. 4 is a flowchart of an exemplary process for completing and submitting answers to a test, quiz or assignment consistent with embodiments of the present invention.

As described in FIG. 4, in the computer-implemented method of the present invention, the student will enter the URL link provided by the teacher (Step 190), and enter the user name and password (Step 200). The student's identity will be authenticated and verified (Step 220), the student's accommodations, if any, will be identified (ex., "double-time").

Following verification, the computer-implemented method of the present invention typically will display instructions (Step 230) on the student's graphic user interface, followed by a series of questions (Step 240). The student will answer the questions by clicking the appropriate multiple choice or true/false answer block, manually adding a textual response, or clicking audio and adding a verbal response. Once satisfied with the responses, the answers can be saved (Step 250) and submitted (Step 260) when the test or assignment is completed.

The student's multiple choice questions will be automatically graded and analyzed, and the teacher will be notified of any question requiring further analysis by the teacher (Step 268). Once the teacher analyzes and grades any text and audio responses, the scores and analysis of the student's answers will be automatically sent to the student.

Returning to FIGS. 2 and 3, the teacher controls offer many advantages. Multiple teachers providing instruction in the same course can use the system of the present invention to create tests, quizzes or homework assignments from the database. Teacher preferences can be adjusted depending on the teacher or can be uniformly applied to all classes to enhance consistency in grading within a school. Importantly, the present invention allows teachers the flexibility to give tests inside and outside of class, while maintaining fairness in the test-taking process by the flexibility to manipulate questions. For example, the URL's may be provided to all students at the same time, but if the URL is not activated within a predetermined timeframe, the questions on the later test may be different than the questions on the test activated earlier.

Still further, the computer-implemented method is a particularly useful tool for ensuring that appropriate accommodations are routinely applied to tests taken by approved students. Addressing accommodations in this manner prevents repeated reminders and requests from students, and eliminates the possibility of being overlooked.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A computer-implemented method for preparing, taking and scoring tests for a class of students and reporting the results thereof, the method comprising:
   electronically storing test questions and analysis in a database;
   electronically storing student identification information, including an email address for each student and authorized time accommodations pertaining to students in the class;
   electronic transmitting a URL to the email address for each student in the class providing a link to a test;
   individually accessing the test using the URL sent electronically by the teacher; and electronically retrieving and applying time accommodations corresponding to the student receiving the URL;
   automatically applying teacher preferences for each student accessing the test;
   automatically generating test questions saved in the database for each student accessing the test based on the teacher preferences;
   electronically responding to the questions and submitting the test for scoring;
   electronically scoring answers to the test questions for each of the students taking the test;
   electronically analyzing the answers to the tests provided by each of the students taking the test and grading each of the tests based on the teacher preferences;
   electronically sending each student the score and analysis corresponding to the test taken by the student; and
   electronically storing the score for each student in the database.

2. The method of claim 1, wherein the steps are repeated over a series of tests, and wherein the scores for each of the series of tests for each of the students is analyzed and graded based on the teacher preferences and the results are stored in the database.

3. The method of claim 1, wherein the questions include questions requiring a multiple choice answer.

4. The method of claim 1, wherein the questions include questions requiring a true or false answer.

5. The method of claim 1, wherein the questions include questions requiring an audible response.

6. The method of claim 1, wherein the teacher preferences include randomly generating questions for each student taking the test.

7. The method of claim 1, wherein the teacher preferences include generating a new set of questions for students accessing the test after a predetermined time.

8. The method of claim 1, wherein the teacher preferences include reordering the same set of questions each time a student accesses the test.

* * * * *